United States Patent [19]

Andersen et al.

[11] Patent Number: 4,762,169
[45] Date of Patent: Aug. 9, 1988

[54] HEATING AND/OR AIR-CONDITIONING SYSTEM FOR THE INTERIOR OF MOTOR VEHICLES

[75] Inventors: Jürgen Andersen; Lothar Busch, both of Gilching, Fed. Rep. of Germany

[73] Assignee: Bayerische Motoren Werke Aktiengesellschaft, Munich, Fed. Rep. of Germany

[21] Appl. No.: 846,455
[22] PCT Filed: Jul. 20, 1985
[86] PCT No.: PCT/EP85/00361
§ 371 Date: Apr. 8, 1986
§ 102(e) Date: Apr. 8, 1986
[87] PCT Pub. No.: WO86/00855
PCT Pub. Date: Feb. 13, 1986

[30] Foreign Application Priority Data

Jul. 24, 1984 [DE] Fed. Rep. of Germany ....... 3427292

[51] Int. Cl.[4] ............... F25B 29/00; B60H 3/00; B61D 27/00
[52] U.S. Cl. ..................... 165/25; 165/22; 165/43; 98/2.01; 98/2.08; 98/2.09
[58] Field of Search ............ 165/24, 22, 42, 43, 165/16, 25; 98/2.01, 2.08, 2.09

[56] References Cited

U.S. PATENT DOCUMENTS 4,289,195 9/1981 Bellot et al. ............... 165/42
4,390,124 6/1983 Nilsson ..................... 165/41
4,460,036 7/1984 Yoshimi et al. ............. 165/42
4,473,109 9/1984 Kojina et al. .............. 165/42
4,482,009 11/1984 Nishimura et al. .......... 165/22
4,537,245 8/1985 Nishimura et al. .......... 165/22

FOREIGN PATENT DOCUMENTS 2410254 4/1975 Fed. Rep. of Germany ........ 165/22
2408838 9/1975 Fed. Rep. of Germany .
3239642 6/1983 Fed. Rep. of Germany .
3151255 7/1983 Fed. Rep. of Germany .
0026008 2/1982 Japan ..................... 165/42
0178914 11/1982 Japan ..................... 165/43
0026617 2/1983 Japan ..................... 165/42

Primary Examiner—Albert W. Davis, Jr.
Assistant Examiner—John K. Ford
Attorney, Agent, or Firm—Barnes & Thornburg

[57] ABSTRACT

A heating and/or air conditioning installation for the inner space of a motor vehicle, particularly individual cars, comprises programmable and manually adjustable devices for the defrost air (4 and 5), foot air (6 and 7) and aeration air (8, 9, 10) inlets. These devices enable one to consider the various sensitivities of the driver and the passengers to temperature and to air streams, since they control different air inlets by means of separate automatic and programmable temperature selectors (11 and 12) for each lateral half (17 and 18) of the inside of the car and by means of adjusting devices (23–26), also independent and previously adjusted according to the needs.

5 Claims, 3 Drawing Sheets

HEATING AND/OR AIR-CONDITIONING SYSTEM FOR THE INTERIOR OF MOTOR VEHICLES

BACKGROUND AND SUMMARY OF THE INVENTION

This invention relates to a heating and/or air-conditioning system for the interior of motor vehicles, particularly passenger cars, of a construction having a manually operable temperature-selection device for the automatic temperature control of the heating and cooling air flowing into the interior and having adjustments of air-admission control elements for the foot space for defrosting and ventilating that are program-controlled as a function of the selected type of operation, defrosting, heating and cooling, and of the temperature of the heating or cooling air flowing into the interior or of the position of the pertaining temperature selection device.

A known air-conditioning system of this construction (BMW "Operating Directions 7281-7321-7351-7451", 01 40 9 760 960, 23. VIII/81, Page 2-38 to 2-40), despite the advantageous temperature control and program control of the air-admission control elements, has the disadvantage that the difference in sensitivity of the drive and the passenger with respect to temperature and drafts cannot be taken into account satisfactorily because the same temperature and air admission is assigned to both side halves of the interior.

In the case of another known air-conditioning system of similar construction (Daimler-Benz "Operating Directions 350 SE-380 SEL-500 SE-500 SEL, Type 126", ZKD IV. 79.6, Page 32, and DE-A-24 08 838), there are separate temperature-selection devices for both side halves of the interior but a joint adjusting-selecting device for the air-admission control elements. As a result, the driver and the passenger can each individually select their own temperature adjustment but only a joint air-admission adjustment. Air-conditioning that corresponds to the individual requirements is also in this case not sufficiently possible.

It is the objective of the invention to develop the temperature control and the air-admission control of a heating and/or air-conditioning system in such a way that it meets the different requirements of the driver and the passenger with respect to temperature as well as with respect to air-admission conditions and is simple to operate.

In order to achieve this objective, the invention in the case of a heating and/or air-conditioning system of a construction as described above, has features, wherein one temperature-selection device respectively is assigned to both side halves of the interior, and wherein the adjustments of the air-admission control elements that are in each case assigned to one side half of the interior are program-controlled separately as a function of the adjustment of both temperature-selection devices or of the temperature, that is determined by them and may be different, of the heating and cooling air flowing into the side halves of the interior. In this way, the driver and the passenger, only by the selection of a desired temperature, may also influence the air-admission conditions which are assigned to the respective temperature by means of the program control of the air-admission control elements. An air-admission condition that fits the respective temperature is therefore ensured in a simple way for the driver and the passenger because of the constructive operation of the program and by the separate exclusive operation of the temperature-selection devices.

Further, a system according to the invention provides in each case, at least one additional manually operable adjusting-selection device for the air-admission control elements assigned to both side halves of the interior, said adjusting-selection devices fixing the air-admission control elements of in each case one side half of the interior in predetermined adjustments that are independent of the program-determined adjustments.

By means of this further development, the possibility also exists that the driver and/or the passenger overdrive the program-determined adjustments for extraordinary requirements, such as one-sided entering of sun rays, with additional fixed adjustments of the air-admission control elements.

In order to keep the constructional expenditures of the control devices within reasonable limits, those adjustments of control elements that have no direct air-conditioning influence on the driver and passenger, are influenced exclusively as a function of selecting devices on the driver's side. Thus, the adjustments of all defroster air-admission control elements of the fan delivery capacity, of the compressor capacity, of the fresh-air/circulating-air alternating control and/or of the rear space ventilating flow are program-controlled or fixed only as a function of the temperature-selection device assigned to the side half of the interior on the driver side and/or adjusting-selection devices.

The foregoing and other objects, features, and advantages of the present invention will become more apparent from the following description, when taken in connection with the accompanying drawings which show, for the purpose of illustration only, one embodiment in accordance with the present invention, and wherein.

Figure 1:
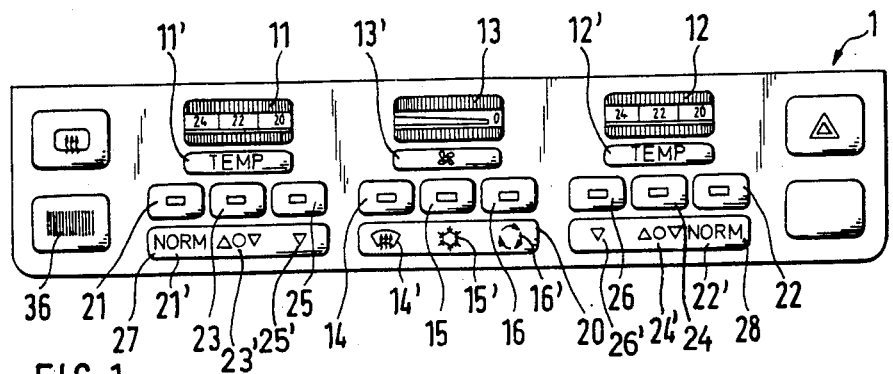
FIG. 1 is an operating part for a heating and air-conditioning system for motor vehicles according to the invention.
Figure 2:
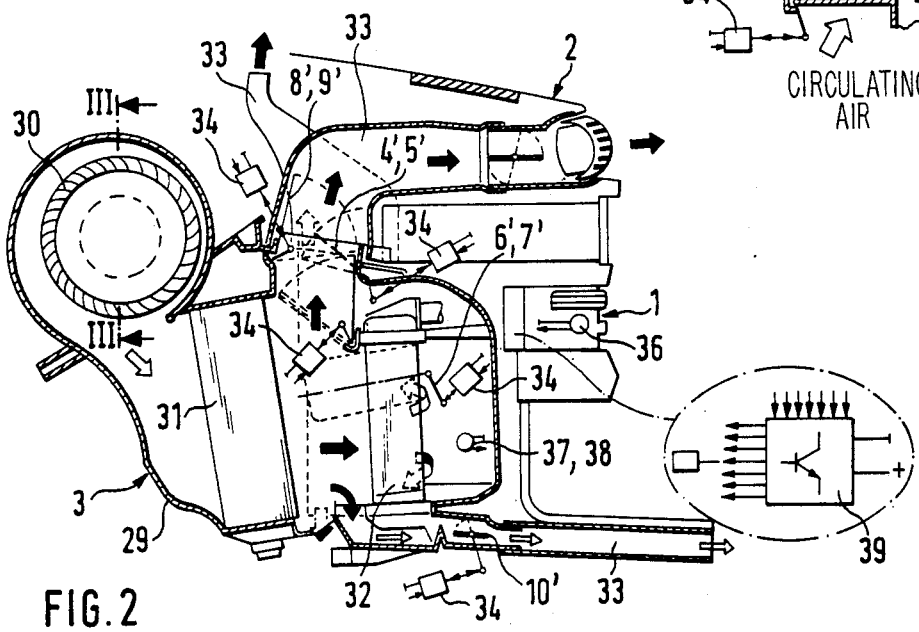
FIG. 2 is a heating and air-conditioning system for the operating part according to FIG. 1.

Referring now to the drawings wherein like reference numerals are used to designate like parts and more particularly to FIGS. 1-4, there are shown a control console 1, FIG. 1, of a passenger car heating and air-conditioning system 2, FIG. 2, with a heating and air-conditioning unit 3 and several heating and cooling-air admission openings 4 to 10 for the defrosting of the front windows 4, (FIG. 4) the defrosting of the side windows 5, the foot and rear space on the driver's side 6, the foot and rear space on the passenger side 7, for the ventilating of the driver's side 8, for the ventilating of the passenger's side 9, and the ventilating of the rear space 10, has manually operable selecting devices 11 to 16 that determine the heating and/or cooling air admission with respect to its temperature, intensity and distribution.

With respect to the temperature, for the half 17 of the interior on the driver's side and for the half 18 of the interior on the passenger side of the passenger car interior 19, temperature-selection unit 11 and 12, FIG. 1, respectively each developed as a knurled wheel having a figure display in °C. is arranged at the corresponding outer areas of the operating part 1. In the center between both temperature-selection units 11 and 12, an air-volume selection unit 13 is installed that is developed as another knurled wheel with a wide-representation of the regulated air quantity and controls a fan power adjuster.

A display field 11' to 13' is located below the selection devices 11 and 13, the display field 11' and 12' having the lettering "TEMP" and field 13' has a symbol for the fan, the fields 11', 12' and 13' being illuminated when the engine ignition and/or the vehicle lights are switched on.

Figure 4:
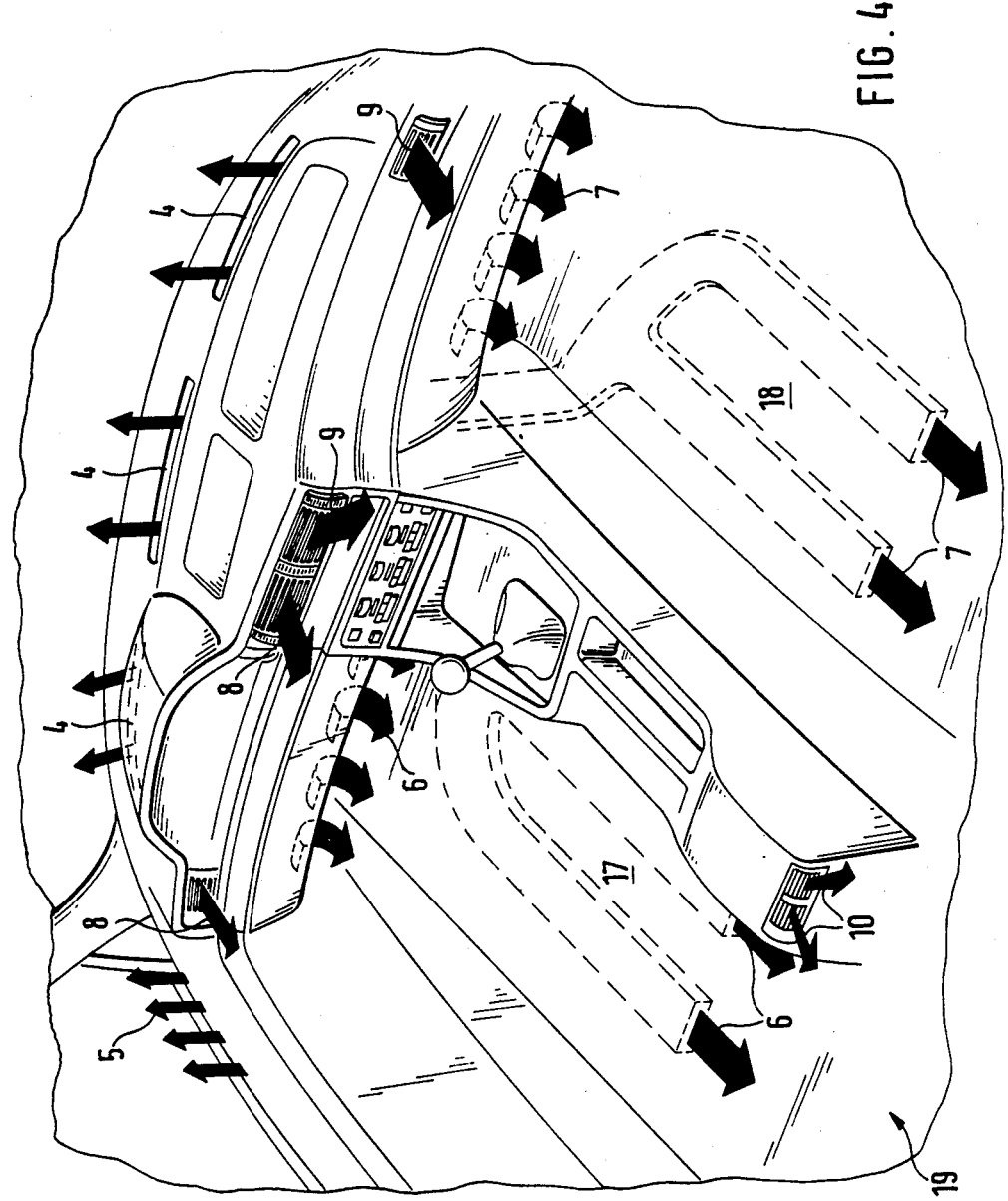
FIG. 4 is a view of the interior of a passenger car with the air-admission points of the heating and cooling air into the interior of the vehicle.

Under the air-volume selection device 13 that affects both side halves 17 and 18, FIG. 4, of the interior, push-buttons 14, 15, and 16 are arranged, which buttons act in the same direction, and are used as selecting devices for the defrosting 14, cooling 15 and circulating-air operation 16 having symbols 14' to 16' that are combined in a display field 20 located below 14 to 16 and can also be illuminated.

Figure 3:
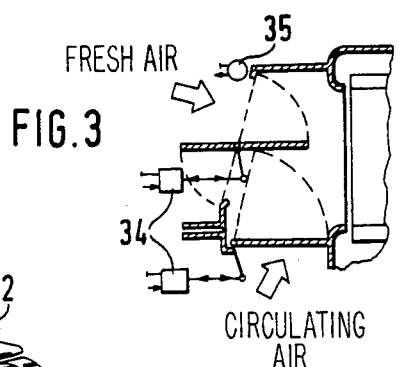
FIG. 3 is a partial section according to line III—III in FIG. 2 in the area of the fan inlet.

Under the driver and passenger temperature-selection devices 11 and 12, there are, respectively, three other push-buttons 21, 23, 25 and 22, 24, 26 that act separately for the two side halves 17 and 18 of the interior and have assigned display fields 27 and 28 and symbols, 21' 23', 25' and 22', 24', 26', as selection devices for the adjustment of the air-admission control elements inside and outside the heating and air-conditioning unit 3, FIG. 3. On each side, one outside push-button, 21 and 22 respectively having the symbol lettering 21' and 22' "NORM" indicators, switch on a program-controlled adjustment of the air-admission control elements separately for both side halves 17 and 18 of the interior, as a function of the basic type of operation of the device 3, FIG. 3, that is determined by the central selection devices 13 to 16, namely the delivering of heating or cooling air by means of the air-volume selection device 13, defrosting, cooling or heating with dehumidifying and circulating air by means of the push-buttons 14, 15 and 16 and ventilating and heating with released push-buttons 14, 15, and 16 and according to the ambient temperature and adjustment of the temperature selection devices 11 and 12.

One central and inner pushbutton 23 and 24 or 25 and 26 respectively switches off, separately for each half 17 and 18 of the interior, the program-determined setting of the air-admission control elements and determines one adjustment respectively of these elements according to the symbols 23' and 24' or 25' and 26'. With switches 23 and 24 activated, the air-admission control elements 6 and 7 to the front and rear foot spaces for sides 17 and 18 respectively are completely open, as well as the additionally manually individually adjustable ventilation admission openings 8 and 9 for sides 17 and 18 respectively as shown in columns 3 and 4, rows 6 and 7 of FIG. 5. When switches 25 and 26 are activated, the front and rear foot spaces 6 and 7 are completely open and the manually individually adjustable ventilation admission openings 8 and 9 are completely closed as shown in columns 5 and 6, rows 6 and 7 of FIG. 5.

Figure 5:
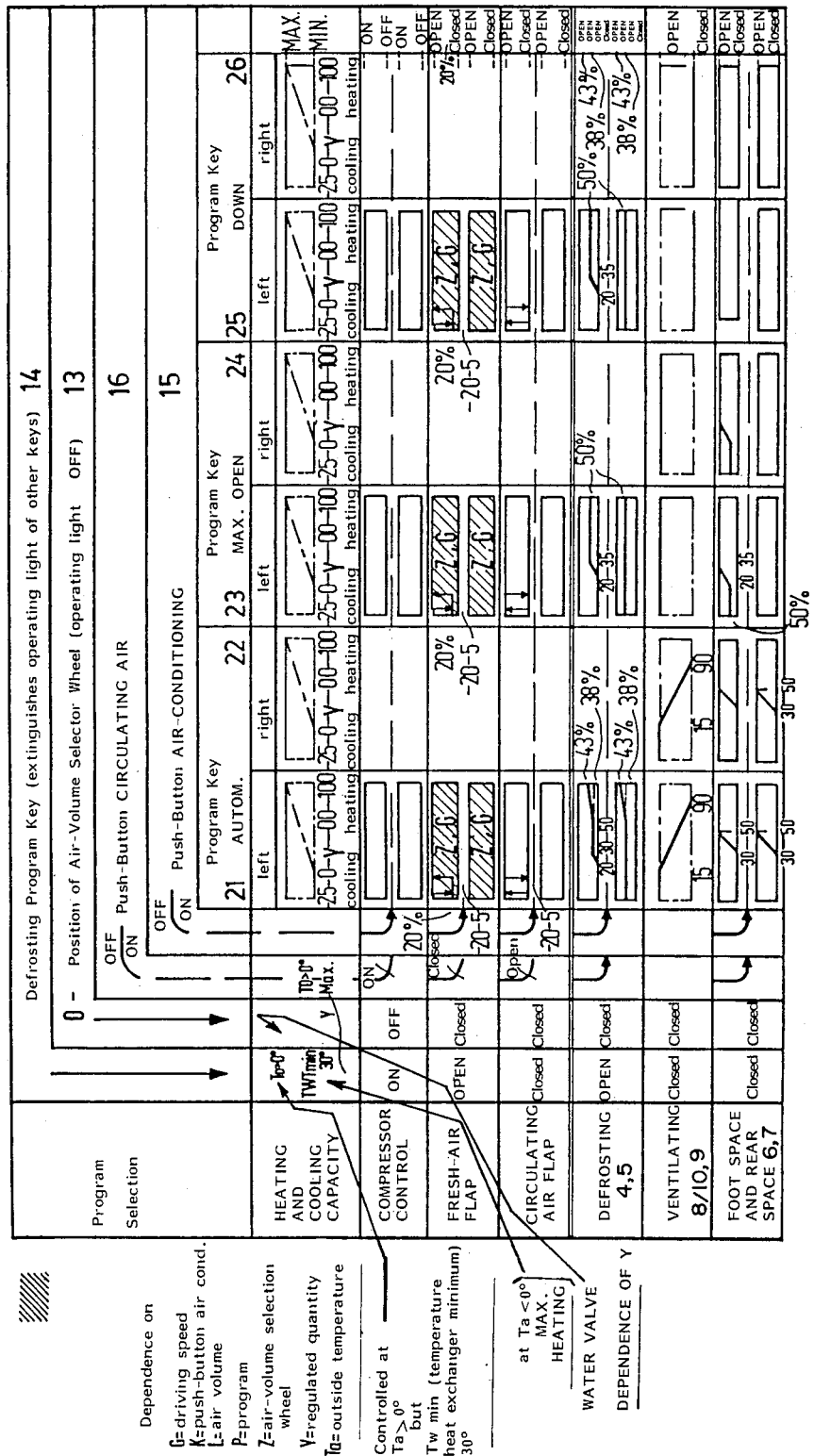
FIG. 5 is a functional diagram for the heating and air-conditioning system according to FIGS. 1 to 4.

By means of the central and inside push-buttons 23 and 25 assigned to the half 17 of the interior on the driver's side, the air-admission control elements for the front and side window defrosting 4 and 5 as shown in Row 5 of FIG. 5 are opened more in comparison to the program-controlled adjustments of switch 21. These adjustments are not influenced by the inside push-button 26 and by the central push-button 24 on the side of the passenger. The central push-button and the inside push-button on the driver's side 23 and 25 also control the air-admission control elements for the ventilation rear space in such a way that its program-controlled adjustments are cancelled and by activation of the push-button 23 ventilations of rear space 10 is fully open and by activation of the push-button 25, is completely closed as shown in row 6 of FIG. 5. In addition, the air-admission openings 10 to the ventilation rear space 10 can also be controlled manually in their outflow cross-sections.

A complete overview of the control functions of the air-conditioning system and its operating and control elements is shown in the functional diagram according to FIG. 5 in a clear representation. It also shows the control influences of the heating and cooling capacity "Y" which adjusts itself automatically by means of a conventional electromagnetically actuated water valve or the also conventional electromagnetic compressor control of a conventional air conditioning system having a compressor not shown, on the one hand, and as a function of the difference between the respective actual temperature and the desired temperature that in each case is determined by means of the temperature selection devices 11 and 12. In addition, the shaded adjusting areas indicate manually controllable air-volume and warm/cold-air mixing alternatives, the detailed functions of which can among other things, be found in connection with the legend of the drawing in FIG. 5.

For the ensuring of the above-described functions, the heating and air-conditioning unit 3, FIG. 2, contains the conventional main components, such as a multi-part housing 29, an air fan 30, an evaporator 31 that is part of a refrigerant cycle that is not shown, a heat exchanger 32 that is part of a cooling cycle of the internal-combustion engine that is not shown, air ducts, air nozzles, and control flaps 33, electrical, pneumatic and equivalently operated motor operators 34, outside-temperature, interior-temperature and coolant-temperature sensors 35, 36, 37-left (driver's side) and 38-right (passenger's side) respectively, temperature setting-value indicators and electrical switches to the push-buttons 21 to 26 in the operting part 1.

An electric or electronic control device 39, FIG. 2, also arranged at the operating part 1 or also at a point in the interior that is easily accessible for servicing, links the signal values received from the emitters, sensors and switches and furnishes program-determined adjusting signals to the motor operators 34 that bring the respective adjusting elements into the corresponding positions that are either identical for the halves of the interior on the driver side and the passenger side or are partly different.

On the whole, the heating and air-conditioning system according to the invention makes possible an air-conditioning and heating of an interior of a motor vehicle that also meets the very different requirements of the driver and the passenger with respect to their sensitivity to temperature and air drafts. For this purpose, the driver and the passenger, by means of a different adjustment of the respective temperature-selection devices assigned to their respective half 17 or 18 of the interior, can cause correspondingly different program-controlled adjustments of the air-admissions elements that are adapted to the correspondingly chosen temperature valve. For extraordinary requirements and/or environmental requirements, such as strong rays of the sun entering from the side, by actuating one or one each of the push-buttons 23 and 25 or 24 and 26, the program-determined adjustment can be overdriven. By an actuating of the push-buttons 21 and 23 with the lettering "NORM", the program-determined adjustment can be reestablished.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

What is claimed:

1. A heating/air-conditioning system for the interior of motor vehicles comprising:
    operation selection means for selecting defrosting, heating or cooling modes of operation;
    a first and second temperature-selection means manually operated separately for both the driver and passenger halves of the interior of the automatic temperature control of the heating and cooling air flowing into the respective half of the interior;
    a plurality of adjustable air-admission control element means for controlling the admission of air flow for the foot space, for defrosting and for ventilating;
    first air-admission selection means for selecting program or fixed modes of air-admission exclusively (a) for said foot space and ventilating air-admission control element means on the driver's half of the interior and (b) for said defrosting air-admission control element means on both halves of the interior;
    second air-admission selection means for selecting program or fixed modes of air-admission exclusively for said foot space and ventilating air-admission control element means on the passenger's half of the interior; and
    control means for individually adjusting the position of said plurality of air-admission control element means in response to said operation selection means, respective first and second temperature-selection means and respective first and second air-admission selection means.

2. A heating/air-conditioning system according to claim 1, wherein:
    said plurality of adjustable air-admission control element means includes adjustable air-admission control element means for said driver and passenger half ventilation, and adjustable air-admission control element means for a rear space ventilation;
    said first air-admission selection means selects program or fixed modes for said driver's half and rear space ventilation air-admission control element means; and
    said second air admission selection means selects program or fixed modes for said passenger half ventilation air-admission control element means.

3. A heating/air-conditioning system according to claim 2, including a fan, compressor and fresh-air/circulating air alternating control and wherein said control means controls said fan and compressor capacity, defrosting and rear space air-admission control element means, and said alternating control as a function of said first temperature selection means and said first air-admission selection means.

4. A heating/air-conditioning system according to claim 1, including a fan, compressor and fresh-air/circulating air alternating control and wherein said control means controls said fan and compressor capacity, defrosting air-admission control element means, and said alternating control as a function of said first temperature selection means and said first air-admission selection means.

5. A heating/air-conditioning system according to claim 1, including:
    means for sensing temperature interior to said vehicle;
    means for sensing coolant temperature on the driver's half of the vehicle;
    means for sensing coolant temperature on the passenger's half of the vehicle; and
    said control means is responsive to said temperature sensing means.

* * * * *